(12) United States Patent
Lien et al.

(10) Patent No.: US 12,110,078 B2
(45) Date of Patent: Oct. 8, 2024

(54) POWER SWITCHING STRUCTURE

(71) Applicant: Li-Ho Yao, Taipei (TW)

(72) Inventors: Norman Lien, Taipei (TW); Chi-Chen Tien, Taipei (TW); Pei-Sheng Hsieh, Taipei (TW)

(73) Assignee: Yao Li-Ho, Taipei (TW)

( * ) Notice: Subject to any disclaimer, the term of this patent is extended or adjusted under 35 U.S.C. 154(b) by 551 days.

(21) Appl. No.: 17/515,556

(22) Filed: Nov. 1, 2021

(65) Prior Publication Data
US 2022/0135178 A1     May 5, 2022

(30) Foreign Application Priority Data

Nov. 2, 2020  (TW) .................................. 109138115

(51) Int. Cl.
| | |
|---|---|
| *B62M 6/50* | (2010.01) |
| *B62J 45/411* | (2020.01) |
| *B62J 45/421* | (2020.01) |
| *B62M 6/55* | (2010.01) |
| *F16H 1/10* | (2006.01) |

(52) U.S. Cl.
CPC .............. *B62M 6/50* (2013.01); *B62J 45/411* (2020.02); *B62J 45/421* (2020.02); *B62M 6/55* (2013.01); *F16H 1/10* (2013.01)

(58) Field of Classification Search
CPC ........ B62J 45/411; B62J 45/421; B62M 6/50; B62M 6/55; F16H 1/10
USPC ......................................................... 280/259
See application file for complete search history.

(56) References Cited

FOREIGN PATENT DOCUMENTS

JP         4382944 B2 * 12/2009

\* cited by examiner

*Primary Examiner* — Jacob D Knutson
*Assistant Examiner* — Felicia L. Brittman-Alabi
(74) *Attorney, Agent, or Firm* — Leong C. Lei

(57) ABSTRACT

A power switching structure includes an input shaft, a detection shaft sleeve fit over the input shaft, an assisting power assembly, and an output assembly selectively drivable by the input shaft and the assisting power assembly. The output assembly includes first and transmission sleeves rotatably mounted to the input shaft. The assisting power assembly includes a power member rotatably mounted to the second transmission sleeve. A one-way bearing is arranged between the first and second transmission sleeves and the power member. An output member is mounted on the second transmission sleeve. A micro-motion static frictional force is induced between the first and second transmission sleeves and the input shaft to allow the detection shaft sleeve to directly and accurately measure a torque value of the input shaft. The one-way bearing arranged between the first and second transmission sleeves and the power member allows for selection among sources of power.

12 Claims, 5 Drawing Sheets

POWER SWITCHING STRUCTURE

DESCRIPTION OF THE PRIOR ART

An existing bicycle torque detection mechanism is generally a strain gauge attached to a surface of a crankshaft. The crankshaft, when driven by pedaling acting on the left-side and right-side crank, would undergo deformation by torque applied thereto, so that the strain gauge may detect a strain occurring in the crankshaft, and a controller is operable to control an assisting power output from an assisting motor or to make direct driving. However, in such a structure, when pedaling is applied to a crank that is provided with a chain wheel, a portion of the force is transmitted to the chain wheel, so that the torque that is applied to the crankshaft would exhibit a great error, thereby reducing the accuracy of measurement, and thus affecting the amount of assisting power output from the motor.

In other words, the known torque detection mechanism may induce an error in the measurement of the torque-induced deformation of the crankshaft and this cause an issue of incorrect supply of assisting power. Further, when it needs to do direct driving by applying an external force, the primary power and the assisting power may cause interference to thereby cause damage of parts and failure of conducting switching according to practical needs of a user.

SUMMARY OF THE INVENTION

Thus, the primary objective of the present invention is to enable selection made for supplying a primary power, an assisting power, or an external power for driving, in order to suit the needs for different types of driving.

A secondary objective of the present invention is to provide a simple structure for reducing transmission loss of an acting force of an input shaft and for timely and accurately measure a torque value of the input shaft to thereby greatly reduce a measurement error of the torque value of the input shaft, making the output of an assisting power smoother and more stably, without causing situations of incorrectness or abrupt rushing, so as to make driving by the assisting power more reliable.

As such, the present invention uses the detection shaft sleeve of the input shaft to indirectly drive the first and second transmission sleeves of the output assembly, and a phenomenon of micro-motion static frictional force is induced between the first and second transmission sleeves and the input shaft, allowing the detection shaft sleeve to directly and accurately measure a torque value of the input shaft, so as to avoid the situation that a small force cannot be effectively detected, while a large force as a result of accumulation thereof cause an abrupt rush of the assisting power, and consequently, outputting of the assisting power is made smooth and stable. Also, based on the arrangement of the one-way bearings between the second transmission sleeve and the first transmission sleeve and the power member, the output member of the second transmission sleeve may select a source of power according to practical needs to thereby enhance flexibility of operation thereof.

DETAILED DESCRIPTION OF THE PREFERRED EMBODIMENT

Figure 1:
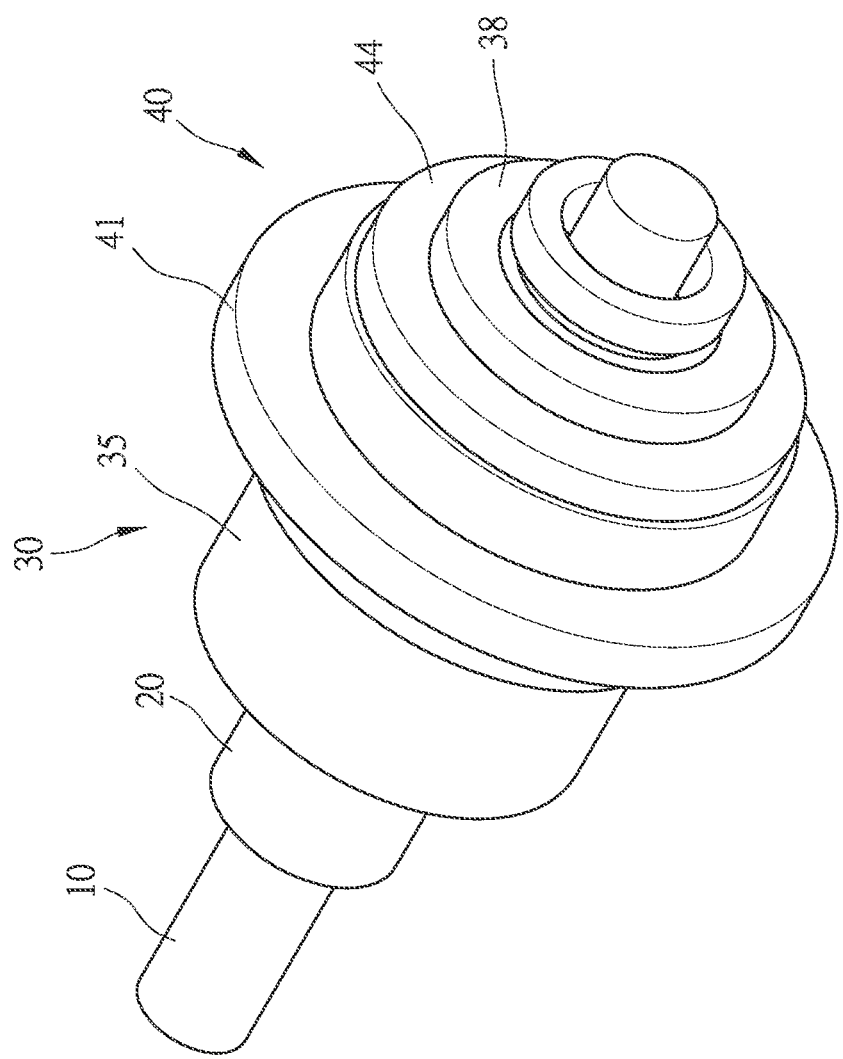
FIG. 1 is a perspective view of the present invention.
Figure 2:
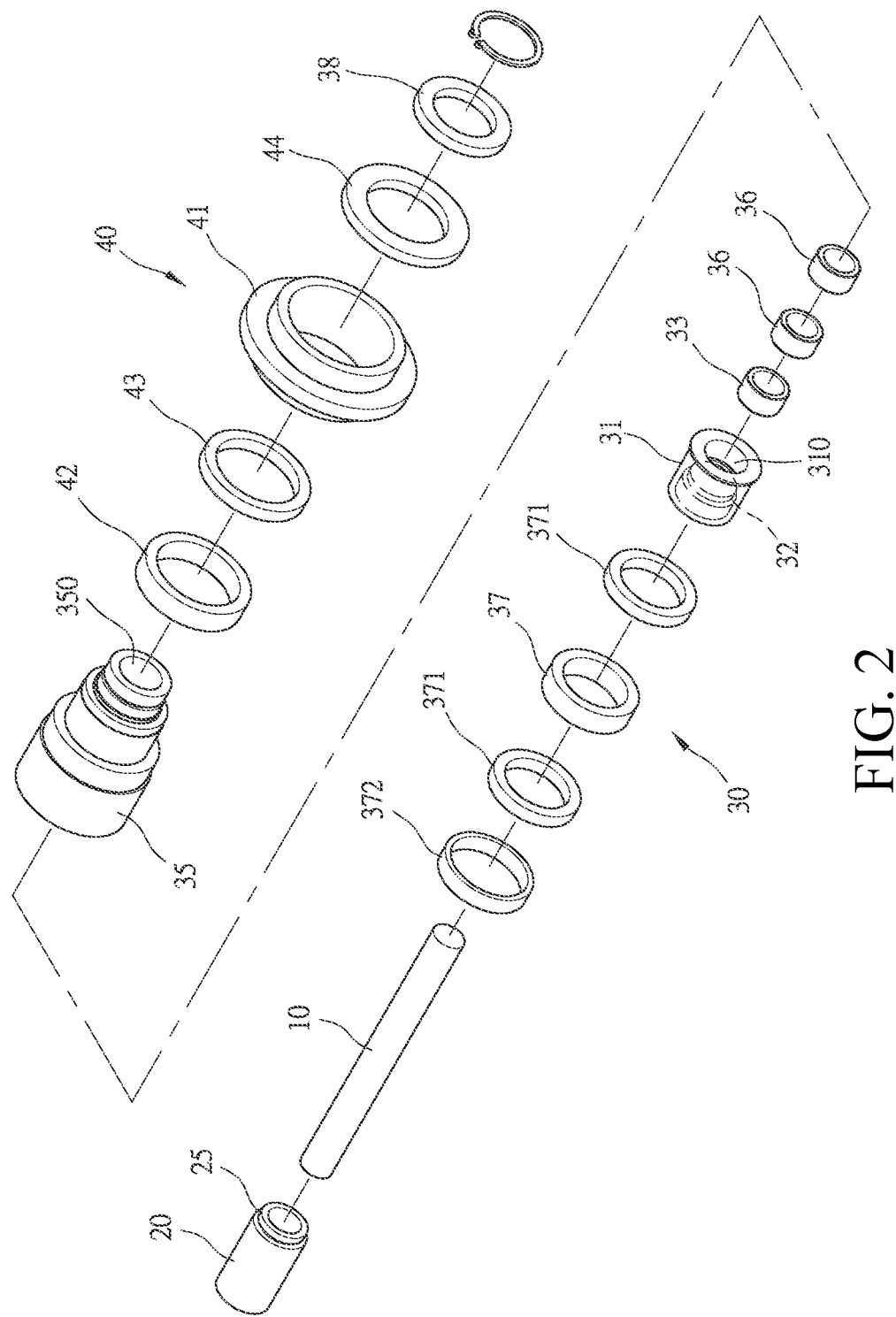
FIG. 2 is an exploded view of the present invention.

As shown in FIGS. 1 and 2, the present invention provides a structure that is made up of an input shaft 10, a detection shaft sleeve 20, an output assembly 30, and an assisting power assembly 40, wherein the input shaft 10 and the assisting power assembly 40 may each perform driving on the output assembly 30 for output in order to individually or jointly drive a driven object, such as a bicycle.

Figure 3:
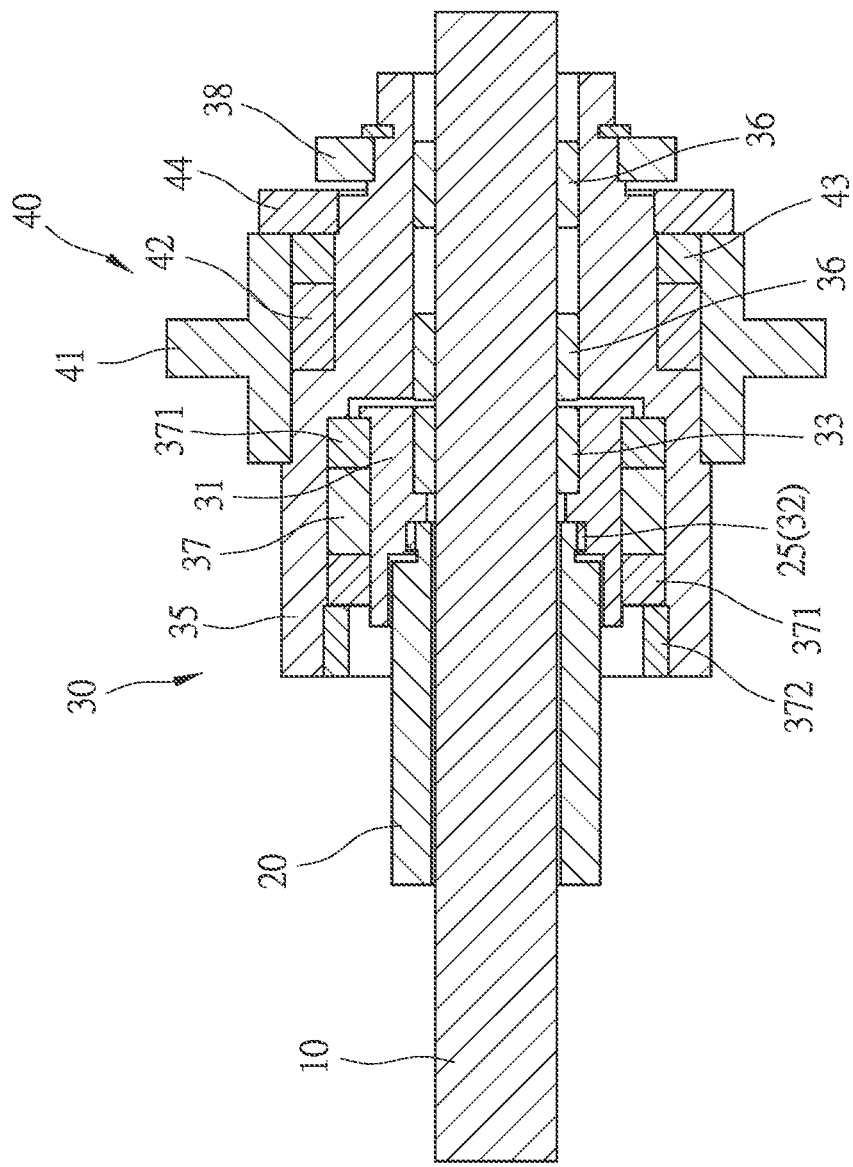
FIG. 3 is a cross-sectional view of the present invention in an assembled form.

Details of the structure are referred to FIGS. 2 and 3, wherein at least one end of two ends of the input shaft 10 may receive an input of a primary power to act thereon for rotation about an axis thereof. The input shaft 10 can be a crankshaft of the bicycle, and pedaling applied to crank arms on the two ends thereof may drive the crankshaft in order to move a chain by means of a chain wheel provided on the crankshaft to drive the bicycle. The detection shaft sleeve 20 is fit on a middle section of the input shaft 10, so that the detection shaft sleeve 20 is rotatable in unison with the input shaft 10. The detection shaft sleeve 20 is operable for measuring a torque value of the input shaft 10 and generates a strain signal corresponding to the torque value. The detection shaft sleeve 20 is electrically connected to a controller (not shown in the drawings), so that the controller may operate a driving member (such as a motor), according to the strain signal or an initiating signal (such as for switching to an external force driving mode), to drive the assisting power assembly 40 to output an assisting power. Further, one end of the detection shaft sleeve 20 is formed with a coupling section 25 for connection with and securely fixing to the output assembly 30 for movement in unison therewith, wherein the coupling section 25 may comprise external mating teeth or internal mating teeth. In the present invention, external mating teeth are taken as a primary example for the coupling section 25 of the detection shaft sleeve 20.

The output assembly 30 is made up of a first transmission sleeve 31, a second transmission sleeve 35, and an output member 38, wherein the first transmission sleeve 31 is rotatably fit on the input shaft 10, and the first transmission sleeve 31 is formed, in a center thereof, with a stepped shaft hole 310. One end of the stepped shaft hole 310 is formed with a coupling section 32 that is connectable with the coupling section 25 of the detection shaft sleeve 20, wherein the coupling section 32 of the first transmission sleeve 31 may comprise internal mating teeth or external mating teeth. In the present invention, internal mating teeth are taken as a primary example for the coupling section 32 of the first transmission sleeve 31 for mating engagement with the external mating teeth of the coupling section 25 of the detection shaft sleeve 20. Further, at least one bearing 33 is arranged between another end of the stepped shaft hole 310 of the first transmission sleeve 31 and the input shaft 10, so as to provide a micro-motion static frictional force between the first transmission sleeve 31 and the input shaft 10, allowing an input acting force of the input shaft 10 not to directly transmit to the first transmission sleeve 31. The second transmission sleeve 35 is rotatably fit on and spanning over outer circumferences of the input shaft 10 and the first transmission sleeve 31. The second transmission sleeve 35 is formed, in a center thereof, with a stepped shaft hole 350. At least one bearing 36 is arranged between one end of the stepped shaft hole 350 of the second transmission sleeve 35 and the input shaft 10, so as to provide a micro-motion static frictional force between the second transmission sleeve 35 and the input shaft 10, allowing an input acting force of the input shaft 10 not to directly transmit to the second transmission sleeve 35. Further, at least one one-way bearing 37 is arranged between another end of the stepped shaft hole 350 of the second transmission sleeve 35 and the first transmission sleeve 31, allowing the first transmission sleeve 31 to drive the second transmission sleeve 35 in a one-way manner in an input direction of the primary power of the input shaft 10, and exhibit idle rotation in an opposite direction. Further, at least one side of the two sides of the one-way bearing 37 is provided with a radial-direction positioning member 371, and an axial-direction positioning member 372 is provided at one side of one such radial-direction positioning member 371, making the second transmission sleeve 35 operate stably on the first transmission sleeve 31. Further, the output member 38 is securely fixed to one end of the second transmission sleeve 35, allowing the output member 38 to be driven by the second transmission sleeve 35. The output member 38 can be a chain wheel of the bicycle that drives a front wheel or a rear wheel of the bicycle by means of a chain.

Further, the assisting power assembly 40 is operated by a driving member of the controller (not shown in the drawings) according to the strain signal to output an assisting power corresponding in magnitude thereto for driving an output member 38 of the second transmission sleeve 35 of the output assembly 30. The assisting power assembly 40 comprises a power member 41 rotatably fit to the second transmission sleeve 35 of the output assembly 30. At least one one-way bearing 42 is arranged between an internal circumference of the power member 41 and the second transmission sleeve 35, allowing the power member 41 to drive the second transmission sleeve 35 in a one-way manner in the direction in which the output member 38 drives the driven object, and exhibit idle rotation in an opposite direction. Further, a radial-direction positioning member 43 is provided at one side of the one-way bearing 42, and an axial-direction positioning member 44 is provided at one side of the radial-direction positioning member 43, making the power member 41 securely operate on the second transmission sleeve 35.

As such, the primary power that operates the input shaft 10 to rotate may be applied to drive the output member 38 of the output assembly 30, and may, according to the strain signal obtained with the detection shaft sleeve 20 measuring the primary power of the input shaft 10 or a switching operation, use the driving member of the controller to drive the power member 41 of the assisting power assembly 40 to provide a driving power of a corresponding magnitude to the output member 38 of the output assembly 30, and as such a power switching structure is formed and provided.

Figure 4:
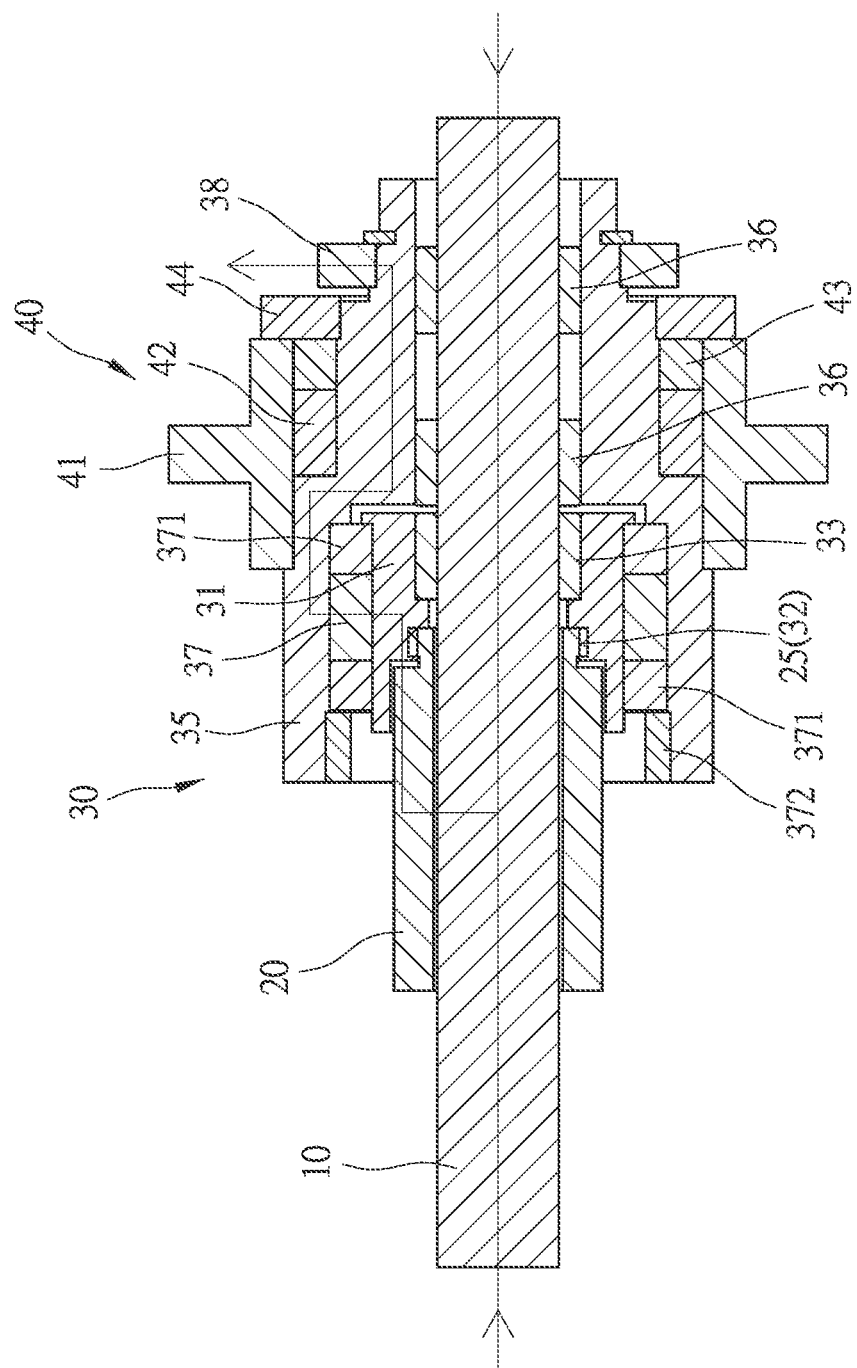
FIG. 4 is a cross-sectional view of the present invention, showing driving being conducted with a primary power.

As to practical operation of the structure of the present invention, as shown in FIGS. 1 and 4, when the input shaft 10 receives primary power from at least one end of the ends thereof, wherein an example is that in a case that the input shaft 10 is a bicycle the crankshaft, the primary power is input through pedaling two side cranks, the input shaft 10 drives, by way of the detection shaft sleeve 20, the first transmission sleeve 31 of the output assembly 30 and operating, by means of the one-way bearing 37, the second transmission sleeve 35, making the output member 38 of the second transmission sleeve 35 driven by the primary power.

Further, the second transmission sleeve 35 uses the one-way bearing 42 on an outer circumference thereof to induce idle rotation with respect to the power member 41 to avoid damage caused by driving the driving member of the controller. Also, the detection shaft sleeve 20 measures the torque value of the input shaft 10 and issues a corresponding strain signal to the controller to allow the controller to make a decision as to whether exceeding a predetermined value or not. If the torque value of the input shaft 10 does not reach a preset value for activating the assisting power assembly 40, the power member 41 of the assisting power assembly 40 is in a stationary state, making idle rotation between the second transmission sleeve 35 of the output assembly 30 and the power member 41 of the assisting power assembly 40 by means of the arrangement of the one-way bearing 42, not to act on the driving member of the controller, such as a motor, in mating engagement with the power member 41 of the assisting power assembly 40 to thereby avoid damage of the driving member.

Figure 5:
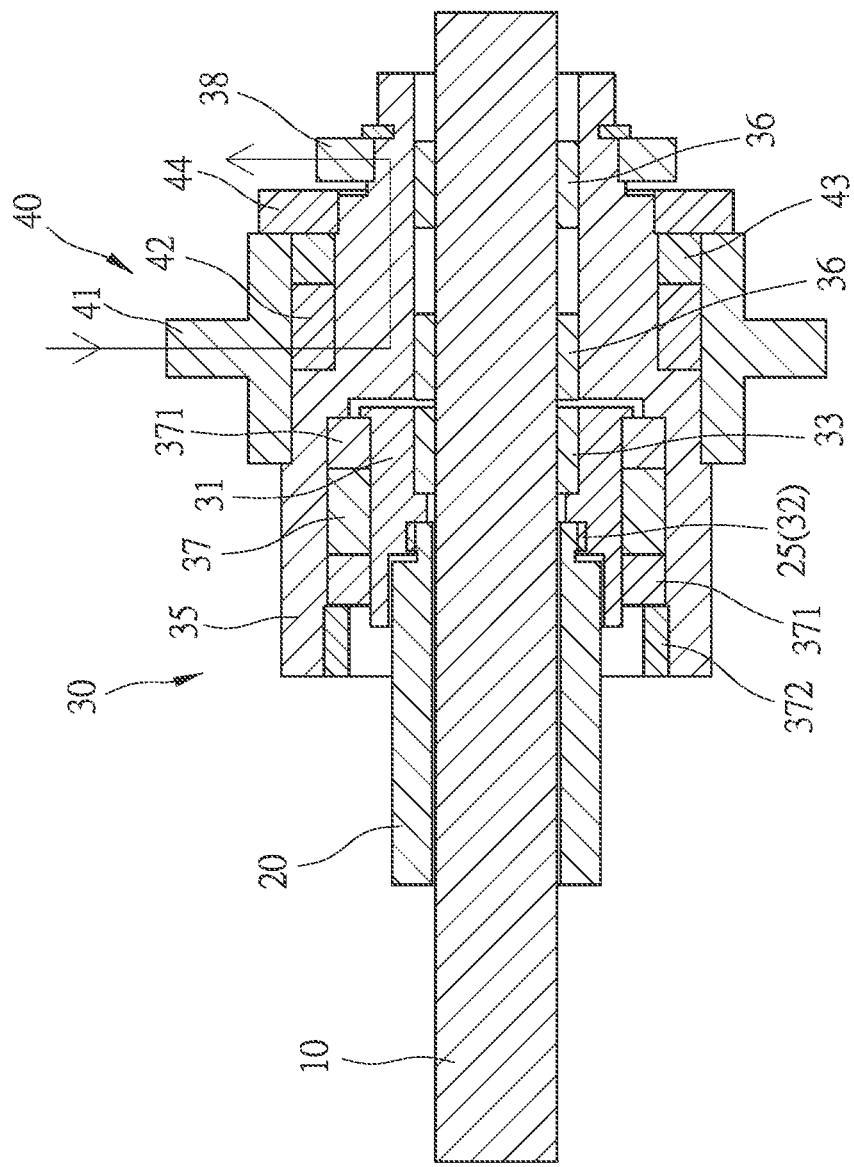
FIG. 5 is a cross-sectional view of the present invention, showing driving being conducted with an external electrical power.

When the torque value with which the input shaft 10 is driven by the primary power becomes increased (such as riding a bicycle uphill) to reach the predetermined value of the controller, or an attempt is made for direct action by means of the driving member, as shown in FIGS. 1 and 5, the controller may activate the driving member thereof that is in mating engagement with the power member 41 of the assisting power assembly 40, and the assisting power assembly 40 outputs a corresponding assisting power, making the power member 41 drive, by means of the one-way bearing 42, the second transmission sleeve 35 of the output assembly 30 to drive the output member 38 to rotate. Since there is the arrangement of the one-way bearing 37 between the second transmission sleeve 35 of the output assembly 30 and the first transmission sleeve 31, idle rotation is induced between the two, without mutual interference between the primary power transmitted through the input shaft 10 and the assisting power or a driving power transmitted through the power member 41 of the assisting power assembly 40.

Based on the design and explanation provided above, the present invention uses the detection shaft sleeve 20 of the input shaft 10 to indirectly drive the first and second transmission sleeves 31, 35 of the output assembly 30, and the bearings 33, 36 are arranged between the first and second transmission sleeves 31, 35 and the input shaft 10 to provide a phenomenon of micro-motion static frictional force, allowing an acting force provided by the primary power input though the input shaft 10 not to spread to the first and second transmission sleeves 31, 35 of the output assembly 30 without any measurement made by means of the detection shaft sleeve 20, so as not to affect the torque-induced deformation of the input shaft 10, allowing the detection shaft sleeve 20 to directly and accurately measure the torque value of the input shaft 10, and exhibiting no delay, and the measured value does not suffer incorrectness, so that the measurement error is minute, being sensitive and delicate, thereby avoiding the situation that a small force cannot be effectively detected, while a large force as a result of accumulation thereof cause an abrupt rush of the assisting power, and consequently, outputting of the assisting power is made smooth and stable. Also, based on the arrangement of the one-way bearings 37, 42 between the second transmission sleeve 35 and the first transmission sleeve 31 and the power member 41, the output member 38 of the second transmission sleeve 35 may select a source of power according to practical needs to thereby enhance flexibility of operation thereof.

We claim:

1. A power switching structure for driving a driven object, comprising:
    an input shaft, which is drivable by at least one primary power;
    a detection shaft sleeve, which is fixedly fit to the input shaft, the detection shaft sleeve being operable to directly detect a torque value of the input shaft and to issue a corresponding strain signal;
    an output assembly, which comprises a first transmission sleeve, a second transmission sleeve, and an output member, the first transmission sleeve being rotatably sleeved on the input shaft, the second transmission sleeve being rotatably sleeved on and spanning over outer circumferences of the input shaft and the first transmission sleeve, at least one one-way bearing being arranged between the second transmission sleeve and the first transmission sleeve to allow the first transmission sleeve to drive, in a one-way manner, the second transmission sleeve in an input direction of the primary power of the input shaft, the output member being mounted on the second transmission sleeve for driving the driven object; and
    an assisting power assembly, which comprises a power member rotatably sleeved on the second transmission sleeve, at least one one-way bearing being arranged between the power member and the second transmission sleeve to allow the power member to drive, in a one-way manner, the second transmission sleeve in a direction in which the output member drives the driven object, in order to generate an assisting power that assistively drives the second transmission sleeve according to the strain signal.

2. The power switching structure according to claim 1, wherein one end of the first transmission sleeve of the output assembly is formed with a coupling section, and a corresponding end of the detection shaft sleeve is formed with a coupling section correspondingly connectable therewith, so as to allow the input shaft to drive, by means of the detection shaft sleeve, the first transmission sleeve.

3. The power switching structure according to claim 2, wherein the coupling section of the detection shaft sleeve comprises external mating teeth, and the coupling section of the first transmission sleeve comprises internal mating teeth engageable therewith.

4. The power switching structure according to claim 2, wherein at least one bearing is arranged between the first transmission sleeve of the output assembly and the input shaft.

5. The power switching structure according to claim 1, wherein at least one bearing is arranged between the second transmission sleeve of the output assembly and the input shaft.

6. The power switching structure according to claim 5, wherein at least one bearing is arranged between the first transmission sleeve of the output assembly and the input shaft.

7. The power switching structure according to claim 1, wherein at least one bearing is arranged between the first transmission sleeve of the output assembly and the input shaft.

8. The power switching structure according to claim 1, wherein the second transmission sleeve of the output assembly is provided with a radial-direction positioning member at two sides of the one-way bearing.

9. The power switching structure according to claim 8, wherein the output assembly is provided with an axial-direction positioning member arranged at an opening side of the radial-direction positioning member.

10. The power switching structure according to claim 1, wherein the power member of the assisting power assembly is provided with a radial-direction positioning member at one side of the one-way bearing.

11. The power switching structure according to claim 10, wherein the assisting power assembly is provided with an axial-direction positioning member at an opening side of the radial-direction positioning member.

12. The power switching structure according to claim 1, wherein the driven object comprises a bicycle, and the input shaft is a crankshaft of the bicycle, the crankshaft being operable through pedaling cranks on two ends thereof to generate the primary power for driving.

* * * * *